United States Patent [19]

Kurihara et al.

[11] Patent Number: 5,141,088
[45] Date of Patent: Aug. 25, 1992

[54] HUB CLUTCH DEVICE

[75] Inventors: Sakuo Kurihara; Masao Teraoka, both of Tochigi, Japan

[73] Assignee: Tochigifujisangyo Kabushiki Kaisha, Toshigi, Japan

[21] Appl. No.: 707,155

[22] Filed: May 29, 1991

[30] Foreign Application Priority Data

May 30, 1990 [JP] Japan .................. 2-138517
Jun. 1, 1990 [JP] Japan .................. 2-141629

[51] Int. Cl.⁵ .................. B60K 23/08; F16D 25/04
[52] U.S. Cl. .................. 192/67 R; 192/88 A; 403/1; 180/247; 384/512
[58] Field of Search ............. 192/49, 50, 67 R, 85 A, 192/88 A, 91 A, 109 R, 110 B; 180/247; 403/1; 301/124 H, 126, 132, 135; 384/512

[56] References Cited

U.S. PATENT DOCUMENTS

| | | | |
|---|---|---|---|
| 2,037,982 | 4/1936 | Hughes | 301/126 |
| 4,046,433 | 9/1977 | Kiener | 301/135 X |
| 4,273,460 | 6/1981 | Ueno | 403/1 |
| 4,282,949 | 8/1981 | Kopich et al. | 192/85 A X |
| 4,293,061 | 10/1981 | Brown | 192/67 R |
| 4,625,846 | 12/1986 | Gomez | 192/67 R |
| 4,627,512 | 12/1986 | Clohessy | 180/247 |
| 4,817,752 | 4/1989 | Lobo et al. | 180/247 |
| 4,960,192 | 10/1990 | Kurihara | 192/67 R |

FOREIGN PATENT DOCUMENTS

| | | | |
|---|---|---|---|
| 61-238516 | 10/1986 | Japan . | |
| 1-122733 | 5/1989 | Japan | 180/247 |
| 1-182133 | 7/1989 | Japan | 180/247 |
| 2-200532 | 8/1990 | Japan | 180/247 |
| 2134992 | 8/1984 | United Kingdom | 384/512 |

*Primary Examiner*—Richard Lorence
*Attorney, Agent, or Firm*—Graham & James

[57] ABSTRACT

A hub clutch device for connecting and disconnecting an axle and a wheel in a part time four-wheel drive vehicle is disclosed closed. The hub clutch device is provided with an outer race secured to a vehicle body, an inner race having a flange portion secured to the wheel and a hub portion provided with a gear portion at a peripheral inner portion, defining a fluid passage with the axle, and a roller member positioned between the outer race and the inner race. A movable wall is positioned inside of the hub portion. The movable wall defines a sealed chamber with the hub portion and is movable in an axial direction of the axle. The sealed chamber communicates with the fluid passage. A sliding gear always engages the gear portion of the hub portion and is axially movable according to the motion of the movable wall to engage a gear part of the axle to connect the axle with the wheel in a rotational direction. An air pump is provided for producing pressure to move the movable wall in an axial direction by transmitting the pressure through the fluid passage and the sealed chamber.

6 Claims, 7 Drawing Sheets

HUB CLUTCH DEVICE

BACKGROUND OF THE INVENTION

1. Field of the Invention

This invention relates to a hub clutch device for vehicle such as an automobile and more specifically to a hub clutch device with a sliding clutch.

2. Description of the Prior Art

The hub clutch device is well known as a device for controlling the connection and disconnection of the wheels and the drive system in a four-wheel drive vehicle.

Figure 1:
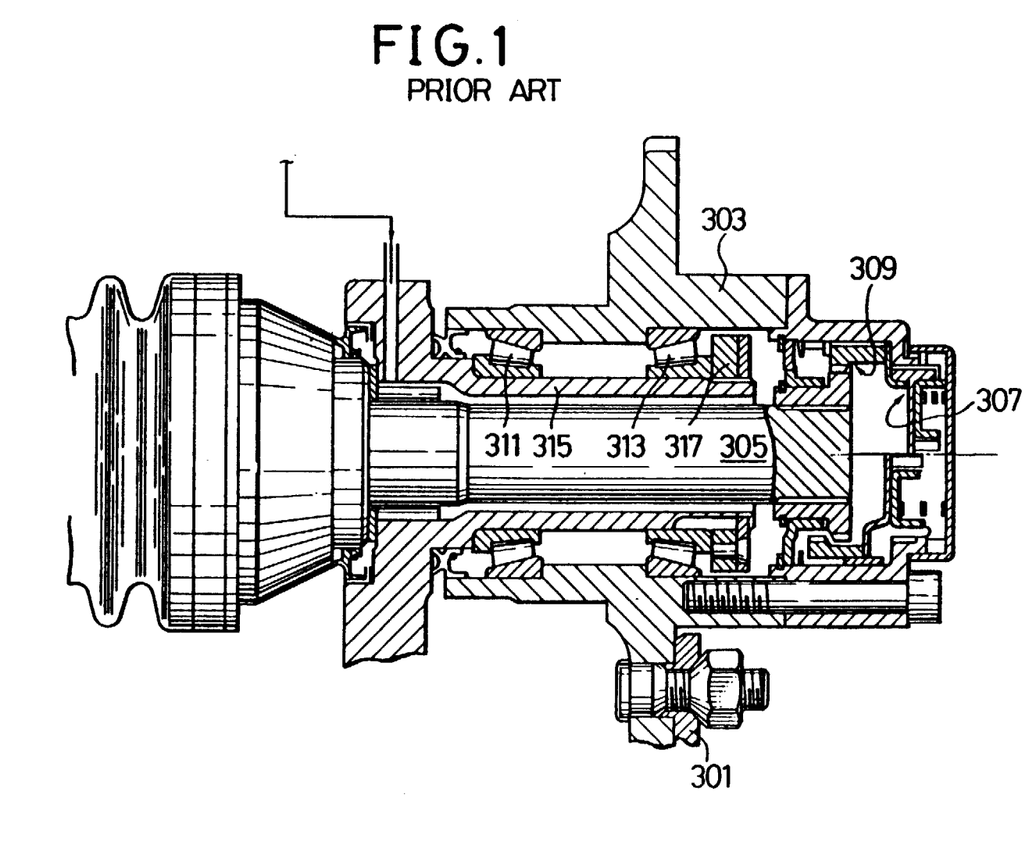
FIG. 1 shows a sectional view of an example of a conventional hub clutch device.

FIG. 1 shows an example of a conventional hub clutch device. This hub clutch has a hub 303 for connecting to a wheel 301. The hub 303 is connected to and disconnected from with the wheel 301 by a sliding clutch 309 driven by an actuator 307. The hub 303 is supported by a spindle 315 of the vehicle body through a pair of tapered roller bearings 311, 313.

However, because the hub 303 is formed separately from the bearings 311, 313, the number of parts in the hub clutch is large, and the number of processes in the assembly of the hub clutch device is large, thus increasing the production costs.

In addition, because the pre-load adjustment of the tapered roller bearings 311, 313 by a lock nut 317 must be carried out in the assembly of the hub clutch device, the assembly is troublesome.

Moreover, the tapered roller bearings 311, 313 must be prevented from running out of grease from the flow of air near the taper roller bearings 311, 313 according to the operation of the actuator 307. Therefore, a seal must be positioned on the right side of the taper roller bearing 311, 313 in the figure, but it is difficult to position the seal at this point because of the lock nut 317.

SUMMARY OF THE INVENTION

An object of the present invention is to provide a hub clutch device which consists of few parts, thus producing low production costs and an easy assembly.

This and other objects can be achieved according to the present invention by providing a hub clutch device comprising: an outer race secured to a vehicle body; an inner race having a flange portion secured to the wheel and a hub portion provided with a gear portion at a peripheral inner portion, defining a fluid passage with the axle; a roller member positioned between said outer race and said inner race; a movable wall positioned inside of said hub portion, defining a sealed chamber with said hub portion, being movable in an axial direction of the axle, said sealed chamber communicating with said fluid passage; a sliding gear always engaging said gear portion of said hub portion and being axially movable according to the motion of said movable wall to engage a gear part of the axle to connect the axle with the wheel in a rotational direction; means for producing pressure to move said movable wall in an axial direction by transmitting the pressure through said fluid passage and said sealed chamber.

DETAILED DESCRIPTION OF THE PREFERRED EMBODIMENTS

Figure 2:
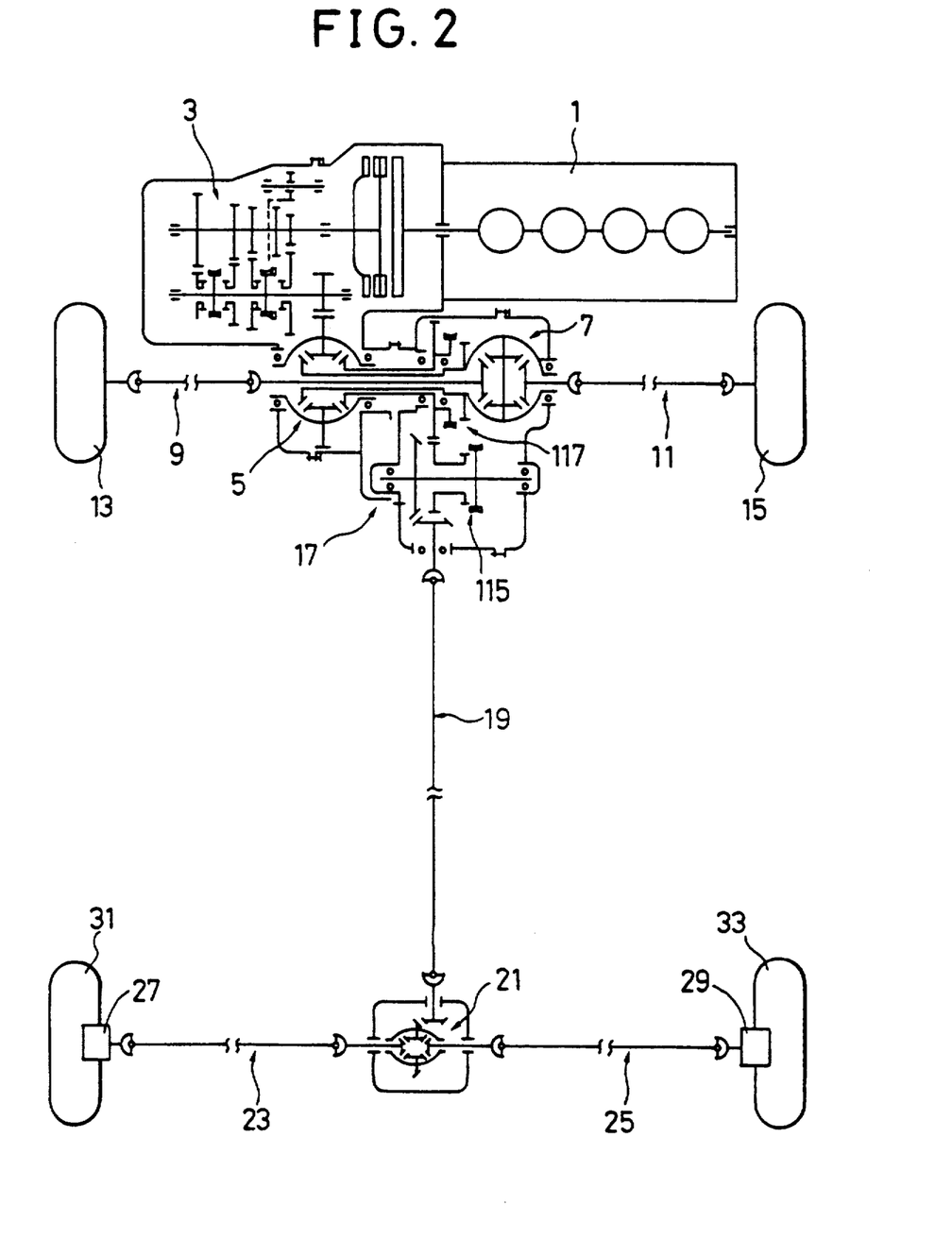
FIG. 2 shows a skeleton structural view of a power system of a vehicle with a hub clutch device of a first embodiment according to the present invention.

In FIG. 2, the right side and the left side respectively correspond to the right side and the left side of the vehicle, and the upper side and the lower side respectively correspond to the front side and the rear side of the vehicle. In addition, the upper side in FIG. 3 corresponds to the front side of the vehicle (the upper side in FIG. 2).

Referring to FIG. 2, a power system comprises an engine 1, a transmission 3, a center differential gear 5 (a differential gear for distributing the driving force from the engine to the front axles and the rear axles), a front differential gear 7 (a differential gear on the front axle side), a pair of front axles 9, 11, a right and a left wheels 13, 15, a transfer 17, a propeller shaft 19, a rear differential gear 21 (a differential gear on the rear axle side), a pair of rear axles 23, 25, a pair of hub clutches 27, 29, and a right and a left wheels 31, 33 or the like.

Next, the hub clutch 29 on the right rear wheel 33 side in FIG. 2 will be described as an example of the hub clutch device according to this invention.

Figure 3:
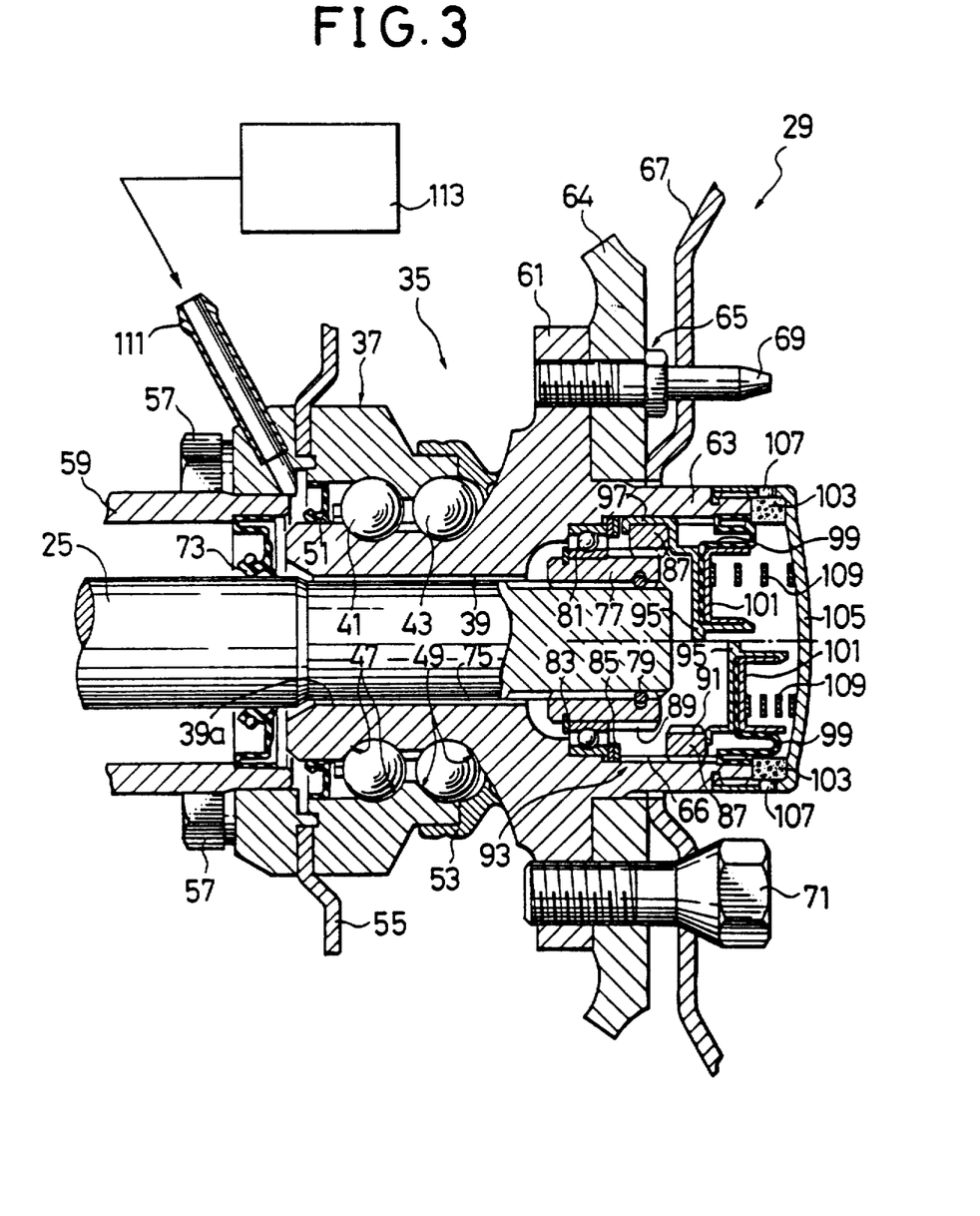
FIG. 3 shows a sectional view of the above hub clutch device.

A bearing 35 for supporting the rear wheel 33 comprising an outer race 37 secured to the vehicle body, an inner race 39 secured to the rear wheel 33, and a plurality of balls 41, 43 as a rolling member positioned between the outer race 37 and the inner race 39. The bearing 35 receive a thrust force to the right or the left by a plurality of deep concavities 47, 49 provided for the outer and the inner races 37, 39. A seal 51 is positioned on the left side in the figure of the ball 41, and a seal 53 is positioned on the right side in the figure of the ball 43. The seals 51, 53 seal the opening between the outer race 37 and the inner race 39.

The outer race 37 is secured to an axle housing 59 through a protective cover 55 by means of a plurality of bolts 57, 57. The bearing 35 can be removed and mounted on the axle housing 59 as a unit.

The inner race 39 is integrally provided with a flange portion 61 and a hub portion 63 (a wheel hub). A brake disc 64 is secured to the flange portion 61 by means of a plurality of bolts 65. The bolts 65 are integrally provided with a guide pin 69 for positioning a road wheel 67 of the rear wheel 33 in the peripheral direction. The road wheel 67 is secured to the flange portion 61 by means of a plurality of bolts 71.

The inner race 39 has a bore 39a at the central portion and the right rear axle 25 inserted into the bore 39a in a freely rotatable manner. A seal 73 is positioned between the axle housing 59 and the axle 25. An aperture 75 as a part of a fluid passage is defined by the axle 25 and the inner race 39. A drive gear 77 is engaged by splines at the tip of the axle 25 and the movement of the drive gear 77 in the axial direction is limited by a stop ring 79. A bearing 81, which centers the drive gear 77 and the axle 25 and prevents the axle 25 from vibrating, is positioned between the drive gear 77 and the inner race 39. A stop ring 83 for the bearing 81 is mounted on the drive gear 77 and a stop ring 85 for the bearing 81 is mounted on the inner race 39.

A gear portion 66 is provided for the inner peripheral surface of the hub portion 63 and a sliding gear 87 engages the gear portion 66 by splines in a manner allowing movement in the axial direction. A plurality of splines 91 is provided for the inner peripheral surface of the sliding gear 87. The splines 91 can engage and disengage a plurality of splines 89 as a gear portion provided for the outer peripheral surface of the drive gear 77. The drive gear 77, sliding gear 87 and hub portion 63 constitute a sliding clutch 93 (a clutch).

When the sliding gear 87 moves on the portion shown in the upper half of FIG. 3 (a locking position) and the splines 91 engages the splines 89, the sliding clutch 93 is engaged to lock the hub clutch 29, connecting the axle 25 to the rear wheel 33. When the sliding gear 87 moves on the portion shown in the lower half of FIG. 3 (a free position) and the splines 91 disengages the splines 89, the sliding clutch 93 is released, thus releasing the hub clutch 29 so that the rear wheel 33 is released from the axle 25 to be in a freely rotational condition.

The sliding gear 87 is secured to an arm 97 of a retainer 95. An outer peripheral portion of a diaphragm 99 as a movable wall is fitted into the inner peripheral portion of the right end portion of the hub 63 in the figure in an airtight manner. An inner peripheral portion of the diaphragm 99 is attached in an airtight manner to the retainer 95 and a plate 101. A cover 105 is screwed onto the right end portion of the hub portion 63 in the figure. A filter 103 is held between the cover 105 and the hub portion 63, and the cover 105 has a air vent hole 107 for ventilating the inside of the cover through the filter 107. A shift spring 109 is positioned between the cover 105 and the plate 101. The shift spring 109 always presses the sliding gear 87 to the locking position through the retainer 95.

A pipe joint 111 is mounted on the upper race 37 on the axle housing 59 side and the pipe joint 111 is connected to a air pump 113 as a means for producing pressure through a pipe. The aperture 75, pipe joint 111 and pipe constitute a fluid passage, and the air pressure from the air pump 113 is conducted to the diaphragm 99 through a space between the seal 51 and the seal 73 and through the aperture 75. The air pressure presses the diaphragm 99 to the right side in the figure against the spring force of the shift spring 109 to move the sliding gear 87 to the free position through the retainer 95. When the air supply is halted, the sliding gear 87 is moved to the locking position by the spring force of the shift spring 109.

A system is provided by which the air pump 113 can be manually operated from the driver's seat or automatically operated according to the conditions of the surface of the road and the steering conditions of the vehicle.

Because the bearing 35 for supporting the wheel 33 is integrally provided with the bearing portion and the hub clutch portion, the number of parts in the hub clutch 29 decreases and the hub clutch 29 becomes small, thus reducing the production costs. Moreover, the assembly becomes easy, and in addition, the exchange with a usual wheel hub is easily performed.

Further, because the bearing 35 for supporting the wheel 33can receive a thrust force, a pre-load adjustment as required in a conventional device is unnecessary and the seals 51, 53 can be pre-mounted on the bearing 35.

Moreover, because the inner race 39 has the hub portion 63, the diameter of the hub clutch 29 become small and the inner diameter of the road wheel 67, which is decided by the outer diameter of the hub portion 63, can be made small.

The hub clutch 27 is constructed in the same way as the hub clutch 29.

Next, the function of these hub clutches 27, 29 will be described with reference to the power system of the vehicle in FIG. 2.

The driving force of the engine 1 is transferred to the center differential gear 5 by the transmission 3. When a 2-4 changing mechanism 115 for connecting and disconnecting the driving force to the rear wheel 31, 33 side in the transfer 17 is connected and the hub clutches 27, 29 are connected, while the driving force of the engine 1 is distributed to the right and left front wheels 13, 15 through the center differential gear 5 and the front differential gear 7, the driving force is distributed to the right and left rear wheels 31, 33, and the vehicle enters the four-wheel drive condition.

When the 2-4 changing mechanism 115 is disconnected to release the rear wheels 31, 33 and a locking mechanism 117 for the center differential gear 5 enters a locking condition, the vehicle enters the two-wheel drive condition to provide the two-wheel drive vehicle with the front engine and front drive.

At this time, when disconnecting the hub clutches 27, 29, the accompanying rotation of the power transmission system from the hub clutches 27, 29 to the 2-4 changing mechanism 115 stops to improve the mileage and to prevent each part of the power transmission system from being subjected to abrasion, vibration, noise or the like.

Next, the second embodiment of the present invention will be described.

Figure 4:
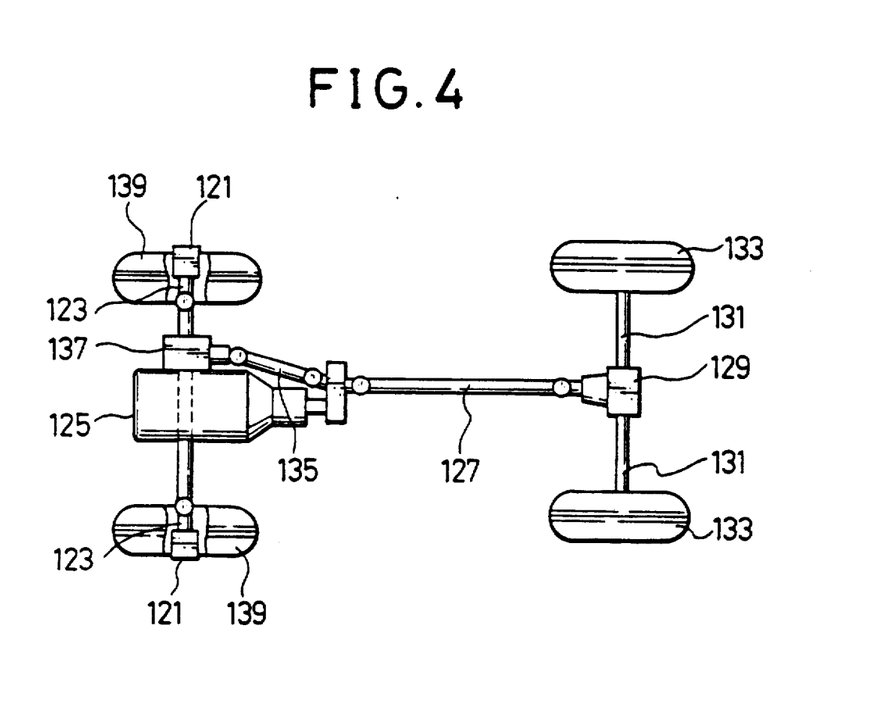
FIG. 4 shows a skeleton structural view of a power system of a vehicle with a hub clutch device of a second embodiment according to the present invention.

In FIG. 4, a hub clutch device 121 is positioned on the outer end of a front axle 123. When air from a small-sized air pump is provided for the hub clutch device 121 to engage a clutch, an engine 125 drives a pair of rear wheels 133 through propeller shaft 127, a rear differential gear 129 and a pair of rear axles 131, while the engine 125 drives a pair of front wheels 139 through a propeller shaft 135, a front differential gear 137 and a pair of front axles 123. On the other hand, when the hub clutch device 121 is disengaged, the engine 125 drives only the rear wheels 133.

Figure 5:
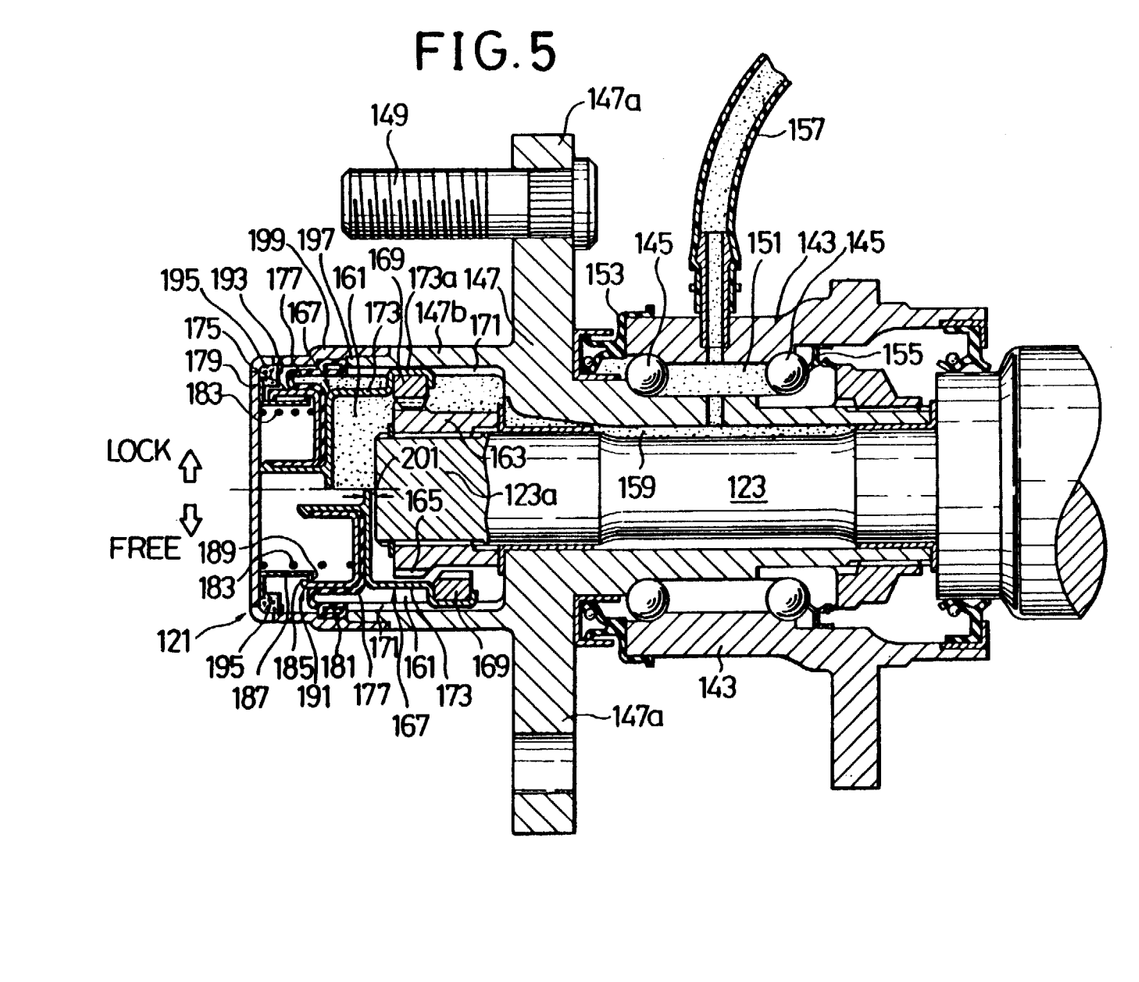
FIG. 5 shows a sectional view of the hub clutch device of the second embodiment.

The sectional view of the hub clutch device 121 is shown in FIG. 5. The hub clutch device 121 is provided with a outer race 143 secured to a vehicle body. The outer race 143 supports an inner race 147 in a freely rotatable manner through a plurality of balls 145 which are formed as unit with the outer and inner race 143, 147. The inner race 147 is provided with a flange portion 147a secured to the front wheel 139 by means of a plurality of bolts 149 and a cylindrical hub portion 147b. The front axle 123 pierces the inner race 147 at the central portion thereof and is supported by the vehicle body in a freely rotatable manner, concentrically with the inner race 147.

Between the inner race 147 and the outer race 143, a pair of seals 153, 155 is positioned to form an air chamber 151 connected with a small-sized air pump through a pipe 157. The air chamber 151 communicates with a air passage 159 defined by the inner race 147 and the front axle 123. Inside the hub portion 147b, another air chamber 161 is formed in communication with the air passage 159.

The tip 123a of the front axle 123 projects into the air chamber 161 and a drive gear 163 engages the tip 123a of the front axle 123. The drive gear 163 is provided with a plurality of splines 165 at the outer peripheral portion and an engaging member 169 of a slide clutch member 167 engages the splines 165. The engaging member 169 always engages a plurality of splines 171 formed on the inner peripheral surface of the hub portion 147b. The engaging member 169 can move in the axial direction along the splines 171 of the hub portion 147b and disengages the splines 165 of the drive gear 163 when the engaging member 169 moves to the right in the figure.

The slide clutch member 167 comprises an inner cylindrical member 173 with a bottom, and an outer cylindrical member 175 with a bottom, and the two bottoms are joined. The engaging member 169 is secured to an arm portion 173a of the inner cylindrical member 173. The central portion of a diaphragm 177 is positioned between the both bottoms in an airtight manner and the outer peripheral portion of the diaphragm 177 is fitted into a cover member 179 in an airtight manner, covering the outer side of the hub portion 147b and secured to the hub portion 147b. The outer peripheral portion of the diaphragm 177 is wound round a fixing ring 181 and the fixing ring 181 is pressed into the inner side of the cover 179.

The outer cylindrical member 175 is pressed toward the right in the figure by the compression spring 183 positioned between the outer cylindrical member 175 and the cover member 179. The left end of the outer cylindrical member 175 is innerwardly bent to form a flange portion 185. A guide member 187 is secured to the inner surface of the cover member 179, and the inner end of the guide member 187 is outerwardly bent to form a flange portion 189. The flange portion 189 of the guide member 187 slidably engages the flange portion 185 of the outer cylindrical portion 175 to form a engaging section 191, so that the slide clutch member 167 may move in the axial direction to the full axial length of the guide member 187. The guide member 187 is secured to the cover member 179 by a snap ring 193 through a air filter 195.

The left end of the hub portion 147b is formed as a step portion 197, while the right end of the cover member 179 is also formed as a step portion 199, and the cover member 179 is securely fitted onto the hub portion 147b by the step portion 197, 199. A plurality of serrations or splines may be used instead of the steps 197, 199.

Next, the assembly of the hub clutch device 121 will be described. First, the guide member 187 is secured to the inner surface of the cover member 179, and the slide clutch member 167 engages the guide member 187, when the engaging member 169 of the slide clutch member 167 is projected to the right by the compression spring 183. At this time, the central portion of the diaphragm 177 is secured to the slide clutch member 167 and the outer peripheral portion of the diaphragm 177 is fitted into the cover member 179.

In this condition, the engaging member 169 is inserted between the hub portion 147b and the drive gear 163 to position the engaging member 169 at the right side of the splines 165. Then, the cover member 179 is pressed on the hub portion 147b and is securely fitted on the hub portion 147b.

At this time, the action of the engaging section 191 prevents the outer cylindrical member 175 from disengaging from the guide member 187, and the compression spring 183 is contained between the cover member 179 and the outer cylindrical member 175, so that the assembly may be very easy. In addition, by adjusting the axial length of the guide member 187, an aperture 201 is provided between the slide clutch member 167 and the tip 123a of the front axle 123. As a result, in the disengaged condition of the clutch, the slide clutch member 167 is prevented from contacting the tip 123a of the front axle 123.

In the hub clutch device 121 assembled in this way, air supplied from a small-sized air pump flows through the pipe 157, the air chamber 151, the air passage 159 and between the slide clutch member 167 and the hub portion 147b into the air chamber 161 and presses the diaphragm 177 to the left in the figure to move the slide clutch member 167 to the left in the figure in the axial direction against the spring force of the compression spring 183. By this movement, the engaging member 169 of the slide clutch member 167 engages the splines 165 of the drive gear 163. Because the engaging member 169 always engages the splines 171 of the hub portion 147b, the front axle 123 is connected to the hub portion 147b through the engaging member 169. When the air pressure is released, the slide clutch member 167 is pressed to the right in the figure by the action of the compression spring 183 to release the engagement between the engaging member 169 and the drive gear 163, so that the hub portion 147b is disconnected from the front axle 123. In addition, oil or the like can be use as a fluid instead of the air.

Figure 6:
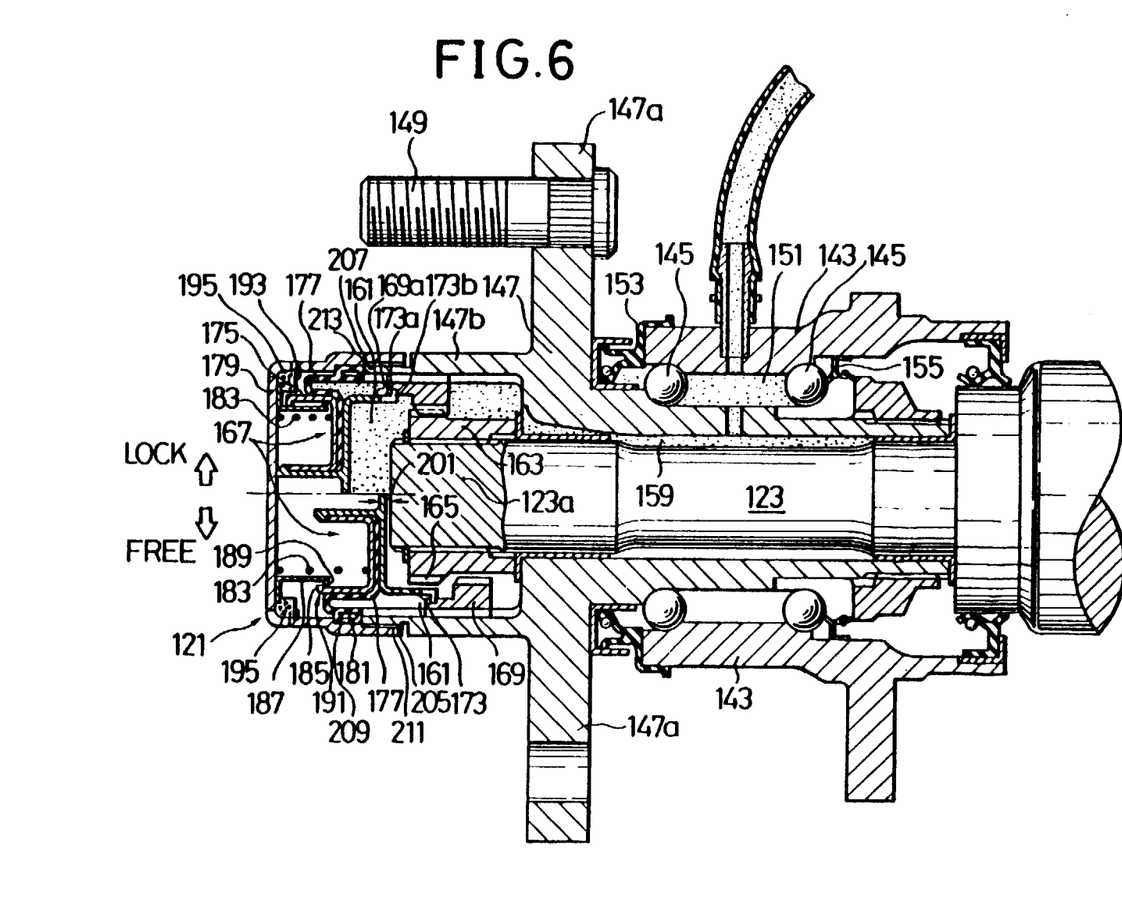
FIG. 6 shows a sectional view of a hub clutch device of a third embodiment according to the present invention.

FIG. 6 shows the third embodiment of the present invention. In FIG. 6, the same reference numerals as in FIG. 5 designate the members corresponding to the members in FIG. 5, so the additional explanation will be omitted.

In this embodiment, the cover member 179 can be connected to the hub portion 147b by a screw. On the outer peripheral portion of the end of the hub portion 147b, a step portion 205 is formed, and a screw portion 207 is formed on the step portion 205. On the inner peripheral surface of the end of the cover member 179, two step portions 209, 211 are formed, and on the right step portion 211 in the figure, a screw portion 213 is formed, the screw portion 213 can engage the screw portion 207. By screwing the screw portion 213 of the cover member 179 on the screw portion 207 of the hub portion 147b, the cover member 179 is fitted to the hub portion 147b.

Figure 7:
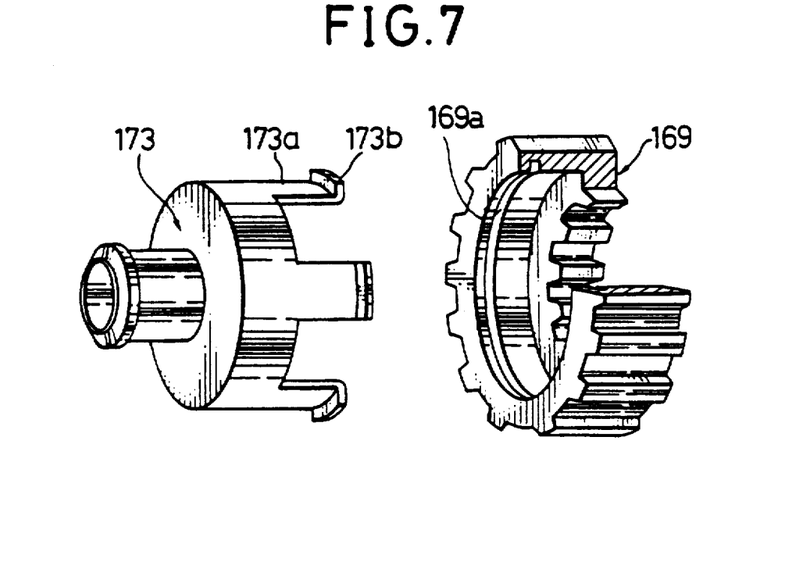
FIG. 7 shows a perspective view of a cylindrical member with a bottom and a engaging member (partly in cross section) shown in FIG. 6.

The engaging member 169 is supported as shown in FIG. 7. A flange portion 173b bending outerwardly is formed at the arm portion 173a of the inner cylindrical member 173. On the inner peripheral surface of the engaging member 169, a ringed groove 169a is formed. The flange portion 173 engages the groove 169a in a manner allowing rotation in the peripheral direction and limiting movement in the axial direction. The flange portion 173 of the arm portion 173a engages the groove 169a, so that the engaging member 169 is adjusted to the normal position in the axial direction and is securely held.

Figure 8:
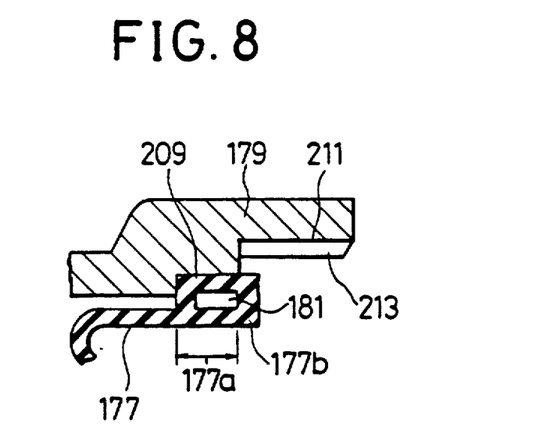
FIG. 8 shows a cross section of the fitting conditions of a diaphragm shown in FIG. 6.

The diaphragm 177, as shown in FIG. 8, is fitted into the cover member 179 by pressing a part 177a of the fixing ring 181, which is rolled by the outer peripheral portion of the diaphragm 177 into the left step portion 209 in the figure of the cover member 179. The other part 177b of the fixing ring 181 projects toward the right step 211.

Next, the assembly of the hub clutch device of the embodiment will be described. First, The slide clutch member 167 engages the guide member 187 secured to the inner side of the cover member 179. At this time, the engaging member 169 of the slide clutch member 167 projects from the cover member 179 by the compression spring 183 positioned between the cover member 179 and the slide clutch member 167. The central portion of the diaphragm 177 is connected to the slide clutch member 167 and the outer peripheral portion of the diaphragm 177 is fitted into the left step portion 209.

In this condition, the engaging member 169 projecting from the cover member 179 is inserted between the front axle 123 and the hub portion 147b to position the engaging member 169 on the right of the splines 165. Then, the screw portion 213 of the cover member 179 is screwed onto the screw portion 207 of the hub portion 147b. At this time, because the flange portion 173b of the arm portion 173a engages the groove 169a of the engaging member 169 in a rotatable manner, the inner cylindrical member 173 supporting the engaging member 169 can rotate relatively to the hub portion 147b. Therefore, the cover member 179 can easily screwed onto the hub portion 147b by the screw portions 213, 207. At this time, because the part 177b of the fixing member 181 is projecting from the left step 209 to the right step side, when the cover member 179 is screwed onto the hub portion 147b,-the projecting part 177b is pressed by the end of the hub portion 147b to ensure an air tight seal between the end of the hub portion 147b and the diaphragm 177.

By this embodiment, the same effects as that of the second embodiment are achieved. Further, the cover member 179 can be easily fitted onto and disconnected from the hub portion 147b, so that the slide clutch can be easily taken a part and assembled and, as a result, the whole hub clutch device 121 can be easily maintained.

In addition, the cover member 179 may be connected to the hub portion 147b by means of a C ring, and a seal member such as an O ring may be put between the cover member 179 and the hub portion 147b.

What is claimed is:

1. A hub clutch device for connecting and disconnecting an axle and a wheel in a part time four-wheel drive vehicle, comprising:
    an outer race secured to a vehicle body;
    an inner race having a flange portion secured to the wheel and a hub portion provided with a gear portion at a peripheral inner portion, said inner race having an axial bore therethrough for receiving in coaxial alignment an end of the axle, said inner race defining a fluid passage with the axle;
    a rolling member positioned between said outer race and said inner race;
    a movable wall positioned inside of said hub portion, defining a sealed chamber with said hub portion, being movable in an axial direction with respect to the axle, said sealed chamber being in fluid communication with said fluid passage;
    a sliding gear always engaging said gear portion of said hub portion and being affixed to and axially movable according to the motion of said movable wall to engage a gear part of the axle to drivingly connect the axle with the wheel in a rotational direction;
    means for producing pressure to move said movable wall in an axial direction by transmitting the pressure through said fluid passage to said sealed chamber.

2. The hub clutch device according to claim 1, further comprising a guide member disposed within said hub for limiting an axial movement of said movable wall.

3. The hub clutch device according to claim 2, wherein said movable wall includes an engaging portion and said hub clutch device further includes a cover member fitted to said hub portion, said guide member being secured to said cover member, and said engaging portion of said movable wall engaging said guide member.

4. A hub clutch device for connecting and disconnecting an axle and a wheel in a part time four-wheel drive vehicle, comprising:
    an outer race secured to a vehicle body;
    an inner race having a flange portion secured to the wheel and a hub portion provided with a gear portion at a peripheral inner portion, defining a fluid passage with the axle;
    a rolling member positioned between said outer race and said inner race;
    a movable wall positioned inside of said hub portion, defining a sealed chamber with said hub portion, said movable wall being movable in an axial direction with respect to the axle and including an engaging portion, said sealed chamber communicating with said fluid passage;
    a sliding gear always engaging said gear portion of said hub portion and being affixed to and axially movable according to the motion of said movable wall to engage a gear part of the axle to drivingly connect the axle with the wheel in a rotational direction;
    a guide member engaging said engaging portion of said movable all to limit axial movement of said movable wall;
    a cover member fitted to said hub portion, said guide member being secured to said cover member; and
    means for producing pressure to move said movable wall in an axial direction by transmitting the pressure through said fluid passage to said sealed chamber.

5. The hub clutch device according to claim 4, wherein said movable wall includes a flange portion engaging said sliding gear in a manner allowing movement in a rotational direction.

6. The hub clutch device according to claim 4, further comprising a cover member screwed onto said hub portion, wherein said movable wall includes a diaphragm, a part of an outer peripheral portion of said diaphragm, being fitted to said cover member and a remaining part of the outer peripheral portion projecting to a tip of said hub portion so as to contact the tip of said hub portion in an airtight manner when said cover member is screwed onto said hub portion.

* * * * *